United States Patent [19]

Talmadge

[11] Patent Number: 5,717,166
[45] Date of Patent: Feb. 10, 1998

[54] METHOD FOR COMBINING TRANSDUCER OUTPUTS

[75] Inventor: Paul C. Talmadge, Ansonia, Conn.

[73] Assignee: Pitney Bowes Inc., Stamford, Conn.

[21] Appl. No.: 328,190

[22] Filed: Oct. 24, 1994

[51] Int. Cl.⁶ .......................... G01G 19/22; G01G 3/14; G01G 3/08; G01G 19/00
[52] U.S. Cl. .................. 177/25.13; 177/229; 177/211; 177/25.11; 177/199
[58] Field of Search .................. 73/862.046; 177/229, 177/211, 210 R, 25.11, 25.13, 199, 200

[56] References Cited

U.S. PATENT DOCUMENTS

| | | | |
|---|---|---|---|
| 4,037,675 | 7/1977 | Storace et al. | 177/229 |
| 4,375,243 | 3/1983 | Doll | 177/25 |
| 4,572,309 | 2/1986 | Nishiyama | 177/50 |
| 4,660,667 | 4/1987 | Uchimura et al. | 177/164 |
| 5,004,058 | 4/1991 | Langford et al. | 177/25 |
| 5,088,330 | 2/1992 | Talmadge | 73/769 |
| 5,117,929 | 6/1992 | Nakamura et al. | 177/185 |
| 5,174,400 | 12/1992 | Hasegawa et al. | 177/200 |
| 5,210,706 | 5/1993 | Nishimaya | 365/574 |
| 5,270,494 | 12/1993 | Davis et al. | 177/25 |
| 5,287,748 | 2/1994 | Talmadge | 73/769 |

Primary Examiner—Cassandra C. Spyrou
Assistant Examiner—Anh Mai
Attorney, Agent, or Firm—Melvin J. Scolnick; David E. Pitchenik; Robert H. Whisker

[57] ABSTRACT

The invention is a system for combining the outputs of two transducers to provide a continuous reading over the combined ranges of the two transducers. The system applies an A.C. signal to the appropriate transducer; the steering for the excitation is controlled by the system microprocessor. The transducers are connected in series mechanically such that the low-range transducer is mechanically stopped before it is overloaded. The outputs of the transducers are connected in parallel and applied to the pre-amp which amplifies the A.C. error signal. The signal from the pre-amp is then applied to the analog-to-digital converter (ADC) for conversion. The ADC converts the pre-amp signal which is then sent to the system microprocessor over a serial link. The system microprocessor then applies the appropriate weighing algorithms to the data and then conveys that information to the parent system.

19 Claims, 12 Drawing Sheets

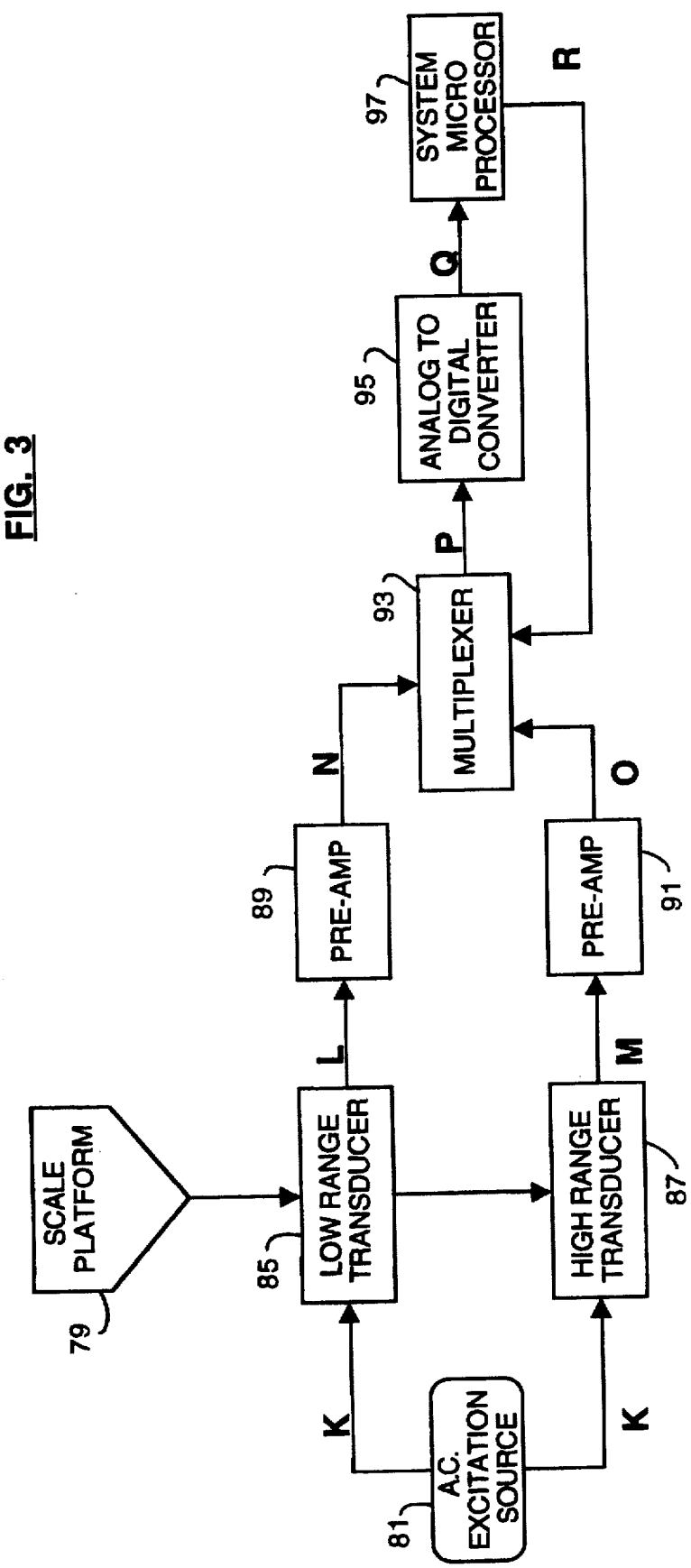

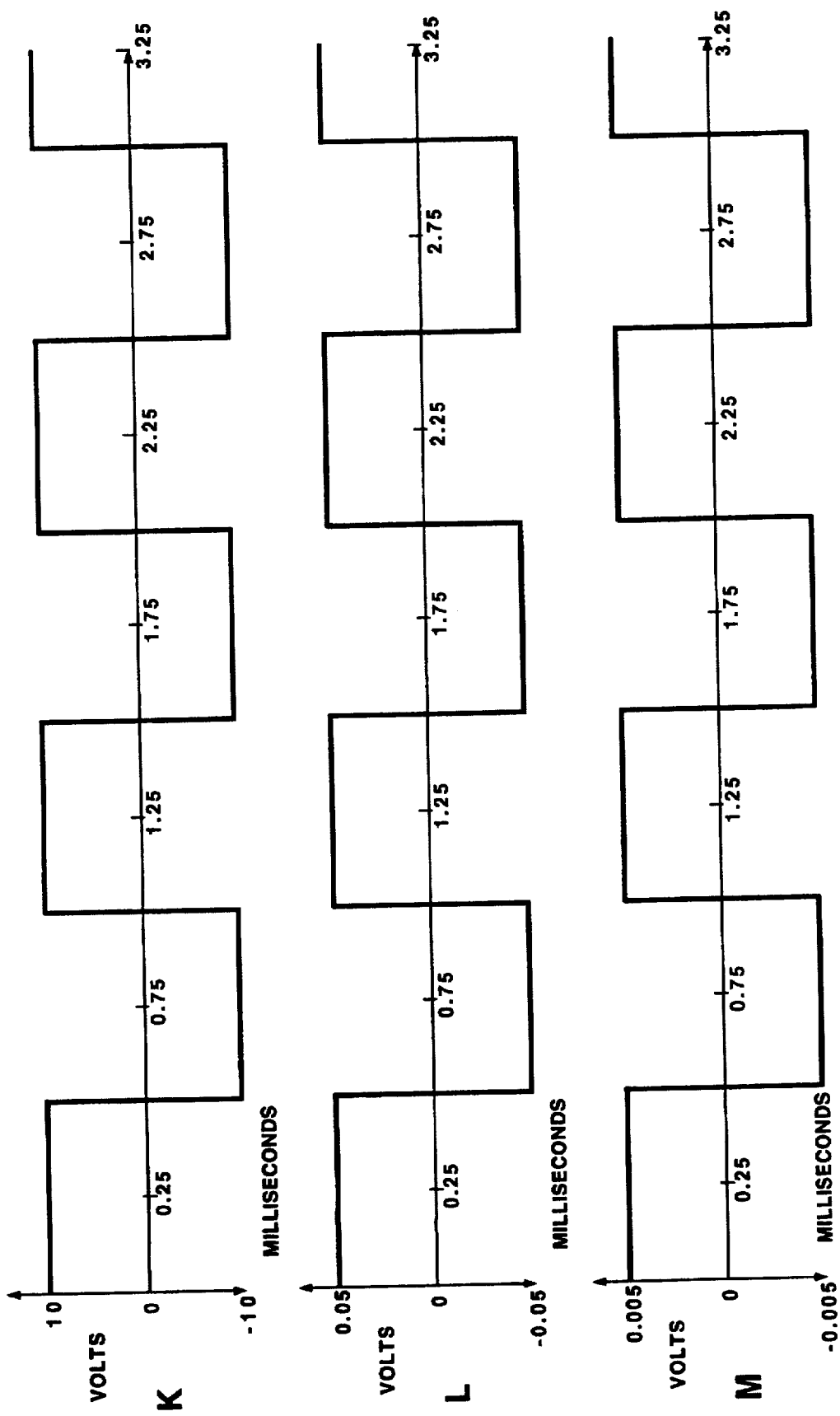

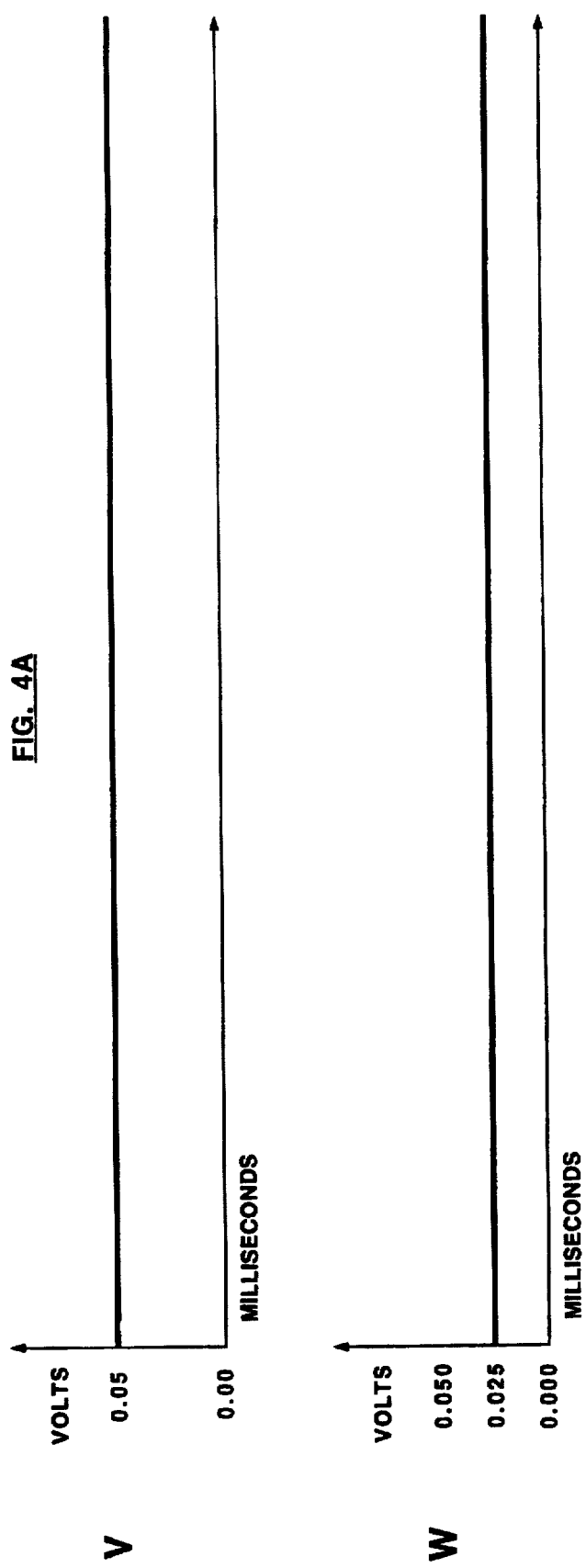

METHOD FOR COMBINING TRANSDUCER OUTPUTS

BACKGROUND OF THE INVENTION

The invention is a system for combining the output of two load cells, or other types of transducers, to provide a continuous reading over the combined ranges of the two transducers within a single weighing scale or system.

Methods have been developed to change the sensitivity of a transducer where it is necessary for that transducer to differentiate between varied tolerances. One such method is described in U.S. Pat. No. 5,287,748, METHOD AND APPARATUS FOR CHANGING THE SENSITIVITY OF A TRANSDUCER, issued to Paul C. Talmadge and assigned to the assignee of the present invention. A disadvantage of a system of this type occurs when the range of loads is so extreme, as compared to the tolerance range of the transducer, that the accuracy of outlier values are beyond the capabilities of the transducer.

Transducers vary in tolerance and capability but may be generally classified into high range or low range capabilities. High range can be classified, for example, as those which can accurately weigh loads from ten (10) to one hundred (100) pounds and have a coarse resolution based in one ounce increments. Low range transducers can be classified as those which can accurately weigh loads from zero (0) pounds to eleven (11) pounds and have a fine resolution based on increments of one-thirty-second (1/32) of an ounce.

Scales or weighing systems that allow the weighing of both letters and parcels on a single scale having two transducers of differing tolerance or capability provide a distinct business advantage by not requiring that two separate scales be maintained in the mail room or shipping room. This is of particular advantage to smaller firms where economies of space and capital preclude having multiple scales.

The prior art has utilized more than one transducer within a single scale or system. But, these scales or systems utilize identical transducers in parallel and average the respective readings, or if using different transducer types they have simply proved to be less efficient and less accurate than that disclosed in the instant application.

For instance, U.S. Pat. No. 4,375,243 discloses a wide range, high accuracy, weighing and counting scale that utilizes two or more transducers in which the first transducer covers a low load range, and each successive transducer covers a greater load range then the preceding transducer. A typical problem with a prior art system such as this is in the cost of the system because it requires two analog-to-digital converters (ADCs) as opposed to a system using a multiplexer and only one ADC. Additionally, these systems have been limited to using only direct current (D.C.) excitation sources which limit the ability of the system when trying to use more efficient and more accurate high frequency ADCs.

U.S. Pat. No. 5,004,058 discloses the use of multiple load cells in a weighing scale wherein the installer can vary electronically the excitation of each load cell from a central controller without the need for adjusting each load cell from a location within the scale pit. This disclosure addresses the problem of weighing scales using multiple load cells where the weight of the object being weighed is determined to be the sum of the individual load cell outputs which are typically summed electronically. This form of weighing scale is limited to using a plurality of identical load cells in parallel. This system type does not allow for shifting from low range to high range tolerances.

U.S. Pat. No. 5,117,929 discloses a weighing apparatus with one load cell and one dummy load cell where the effect of standard weight placed on the dummy cell is removed from the digital data of the dummy cell to obtain the effect of external vibrations which can then be subtracted from digital data of the standard load cell.

U.S. Pat. No. 5,210,706 discloses a load cell weighing device with a plurality of load cells in which detection values are respectively output from the load cells. The values are noise-reduced by digital filters and the resulting values are summed to provide weight data. The layout of the cells and the use of digital filters serve the purpose of avoiding degradation in the measuring accuracy due to low frequency noises.

U.S. Pat. No. 5,174,400 discloses a weighing apparatus in which a plurality of weighing sections are connected to a main unit in which each section has an instability detection section for detecting the instability of a weight signal. The main unit has a section by which the weight data from the weighing section whose weight signal is unstable is selected for display.

The present invention overcomes the limitation of the single transducer by providing continuous reading over the combined ranges of load cells within a weighing scale so as to provide fine resolution readings of low weight items and yet still accurately read high range weights. More particularly, this system provides a scale with a capability to weigh both letters and parcel packages with the resolution required by postal authorities or common carriers in each case.

SUMMARY OF THE INVENTION

According to the invention, the object is achieved and the disadvantages of the prior art are overcome by a system for combining the outputs of two transducers to provide a continuous reading over the combined ranges of the two transducers. The system applies an A.C. signal to the appropriate transducer; the steering for the excitation is controlled by the system microprocessor. The transducers are connected in series mechanically such that the low-range transducer is mechanically stopped before it is overloaded, as is known to those skilled in the art. The outputs of the transducers are connected in parallel and applied to the pre-amp where the A.C. error signal is amplified. The signal from the pre-amp is then applied to the analog-to-digital converter (ADC) for conversion to a digital signal. The ADC converts the pre-amp signal, which is then sent over a serial link to the system microprocessor where it is demodulated. The system microprocessor then applies the appropriate weighing algorithms to the data and then conveys that information to the parent system.

BRIEF DESCRIPTION OF THE DRAWINGS

FIG. 3A is a block diagram of an alternative embodiment of the invention wherein an A.C. excitation signal is continuously applied.

FIG. 3 is a representation of the waveforms being presented by the low range capacity and the high range capacity transducers, and of the steering for the excitation in the embodiment of FIG. 3.

FIG. 4A is a representation of the waveforms being presented by the low range capacity and the high range capacity transducers of FIG. 4.

DETAILED DESCRIPTION OF THE INVENTION

Figure 1:
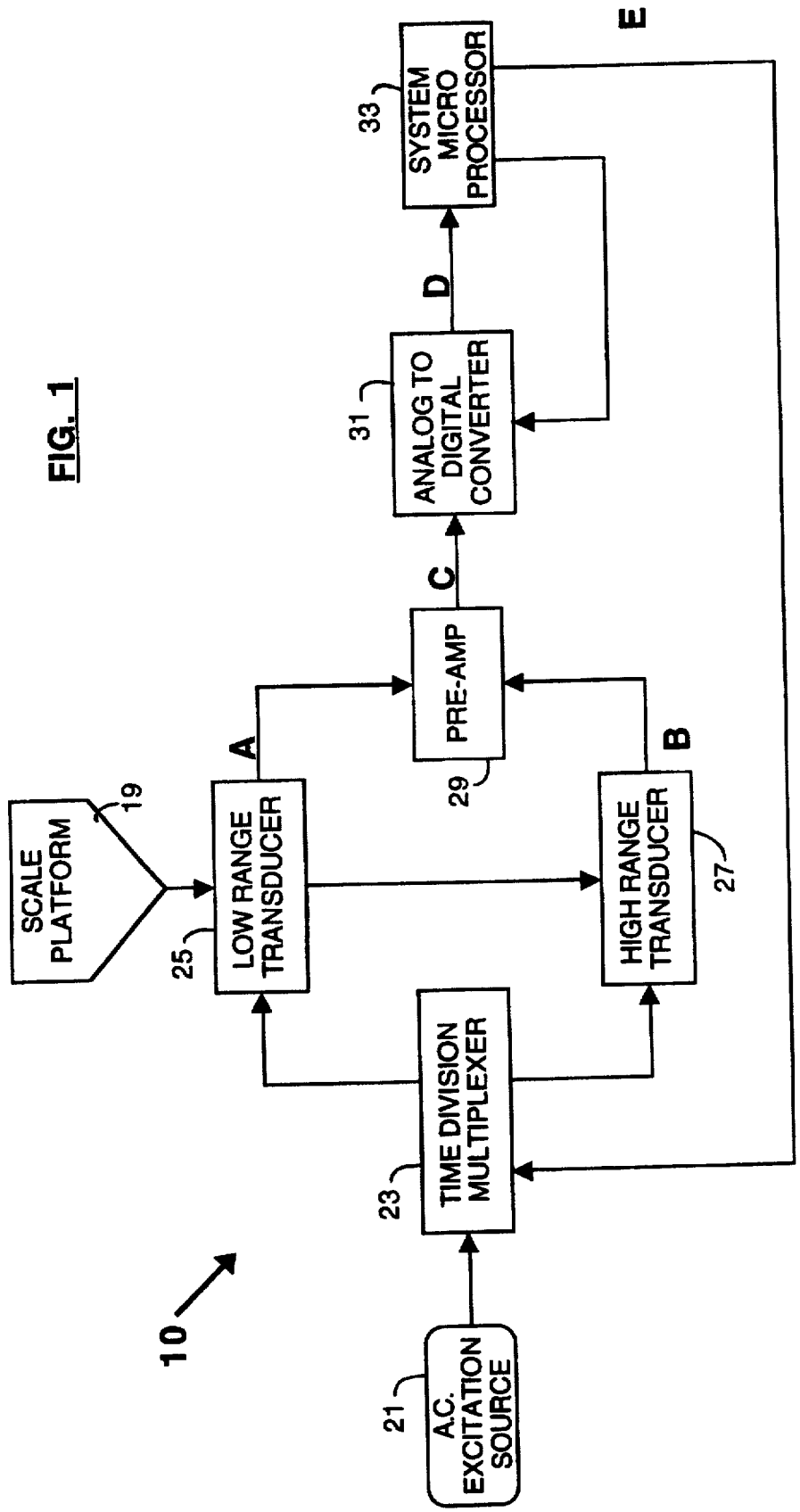
FIG. 1 is a block diagram of an embodiment of the subject invention wherein a time division multiplexer switches the excitation signal to a low or high range transducer.

FIG. 1 shows scale system 10 in accordance with a preferred embodiment of the subject invention. Scale system 10 utilizes A.C. excitation source 21 which is preferably in the form of an A.C. square wave signal of a type disclosed in U.S. Pat. No. 5,088,330, SQUARE WAVE EXCITATION OF A TRANSDUCER, issued to Paul C. Talmadge and assigned to the assignee of the present invention. Preferably, the peak amplitude of this signal will be substantially greater than the maximum D.C. excitation signal which can be used without overheating in order to improve the signal to noise ratio of the scale system. Preferably, the A.C. excitation signal will have a range of 20–40 volts peak to peak and can be used with commercially available parallelogram type load cells. Further elaboration on an available circuit for modulating or demodulating an input potential, such as a square wave, is described in U.S. Pat. No. 5,121,008, CIRCUIT FOR GENERATING OR DEMODULATING A SQUARE WAVE AND OTHER WAVE FORMS, issued to Paul C. Talmadge and assigned to the assignee of the present invention.

In FIG. 1, A.C. excitation source 21 applies the generated excitation voltage to multiplexer 23. Multiplexer 23 may be in the form of a CMOS analog multiplexing switch of the time division analog type. Multiplexer 23 will alternate the application of the voltage between low capacity (low range) transducer 25 and high capacity (high range) transducer 27 in response to steering signal E generated by system microprocessor 33.

Figure 1A:
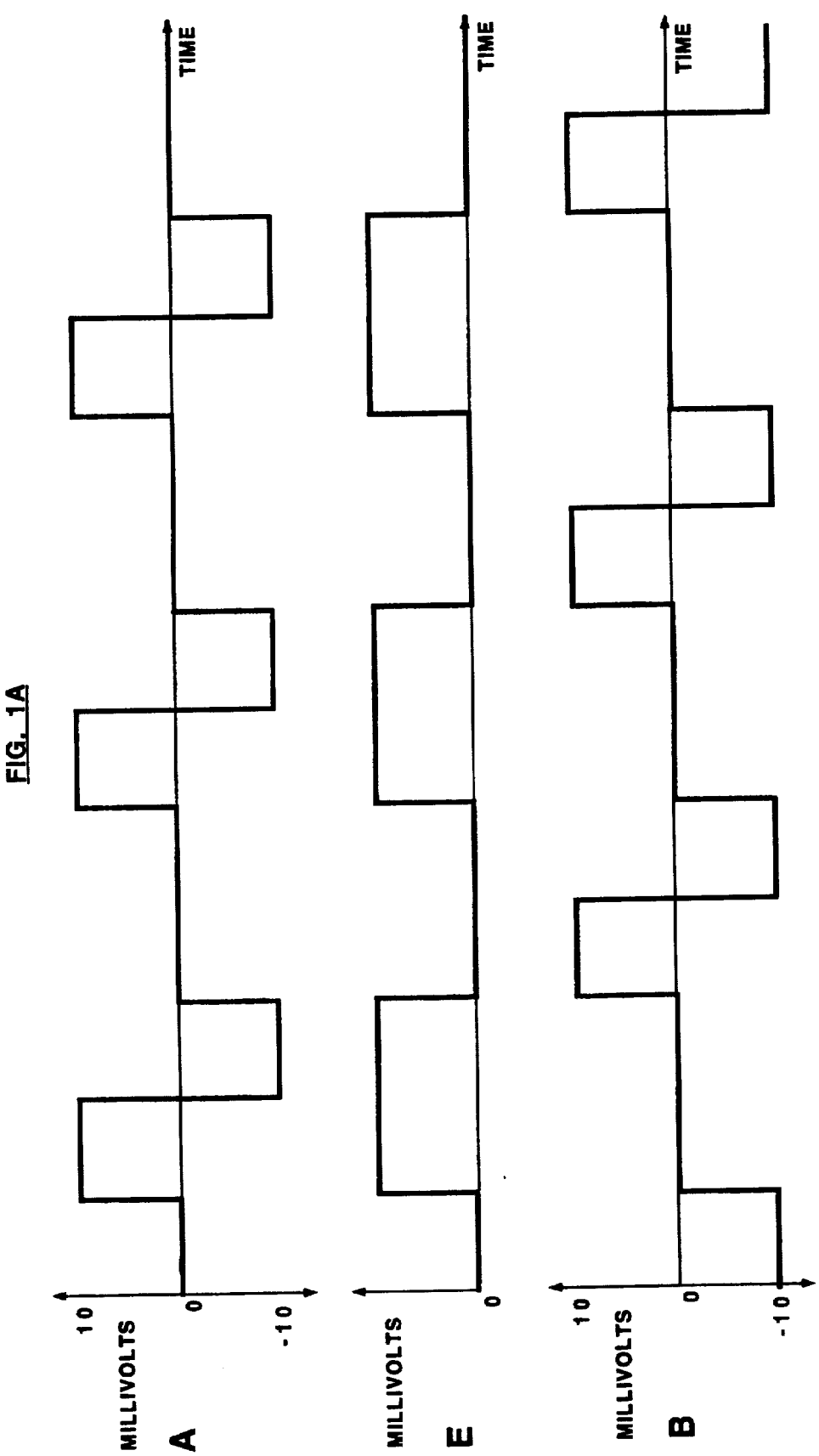
FIG. 1A is a representation of the waveforms being presented by the low range capacity and the high range capacity transducers at maximum tolerance, and of the steering for the excitation in the embodiment of FIG. 1.

As is seen in FIG. 1A, steering signal E is preferably symmetric so that each of transducers 25 and 27 operates at a 50% duty cycle.

The choice of transducer capacity is dependent upon the purpose of the scale or system in which the transducer is to be employed. For example, in a postal or shipping environment that might combine the needs of processing low weight mail pieces with those of heavier weight parcels, a low range transducer with a capacity of 1–11 pounds and a tolerance of one-thirty-second ($\frac{1}{32}$) of an ounce could be employed together with a high range transducer having a capacity of 10–100 pounds and a tolerance of one (1.0) ounce. Suitable transducers for this embodiment are commercially available as a strain gauge type load cell as manufactured by Tedea-Huntleigh of Canoga Park, Calif. and of Israel.

Transducers 25 and 27 are preferably conventional load cells which provide an output which is proportional to the magnitude of the excitation voltage and the applied load, though use of other forms of transducers is within the contemplation of the subject invention.

Multiplexer 23 alternately applies an A.C. signal of 10–20 volts peak to peak to the transducers 25 and 27. Steering signal E for the excitation is controlled by system microprocessor 33 on a time division basis based upon the capability of analog-to-digital converter (ADC) 31 further described below. The preferred excitation signal cycle is a 1 KHz square wave of approximately 1 millisecond followed by 1 millisecond of null voltage. A resulting benefit of the current invention is the power saving of the A.C. half duty cycle which represents a considerable power savings over methods currently employed in the art.

Transducers 25 and 27 are connected in series mechanically so that a load applied to scale platform 19 is applied equally to each transducer. Low range transducer 25, and preferably both of transducers 25 and 27, is mechanically stopped in a conventional manner to provide overload protection. System microprocessor 33 will shift the excitation signal from low range transducer 25 to high range transducer 27. Multiplexer 23 shifts the excitation signal continuously between low range transducer 25 and high range transducer 27 even if low range transducer 25 has been mechanically stopped. The purpose of the continuous shifting is to allow the system to react more quickly when a load is removed from scale platform 19 and a new load is placed thereon.

Output waves A and B of transducers 25 and 27 respectively, indicative of the weight placed upon scale platform 19, are applied to pre-amplifier (pre-amp) 29. An A.C. gain stable pre-amp is preferred because it is relatively inexpensive to build. At pre-amp 29, output waves A and B of transducers 25 and 27 respectively, are amplified to produce waveform output C which is a composite of the output waveforms A and B.

Analog-to-digital converter (ADC) 31 receives composite output signal C and generates a sequence of digital signals with a range of $1 \times 10^{-6}$ to $10 \times 10^{-3}$ volts corresponding to analog values of composite output signal C. Preferably, ADC 31 is a high speed device of the type used to convert audio signals in the range of approximately 1 Hz to 20 KHz; this allows a switching range of 1 KHz and the ability to sample a large number of times per cycle. As shown in FIG. 1A, steering signal E has a period of 1 millisecond so that each period of composite output C is 500 microseconds and is sampled by ADC 31 approximately 10 times.

Figure 1B:
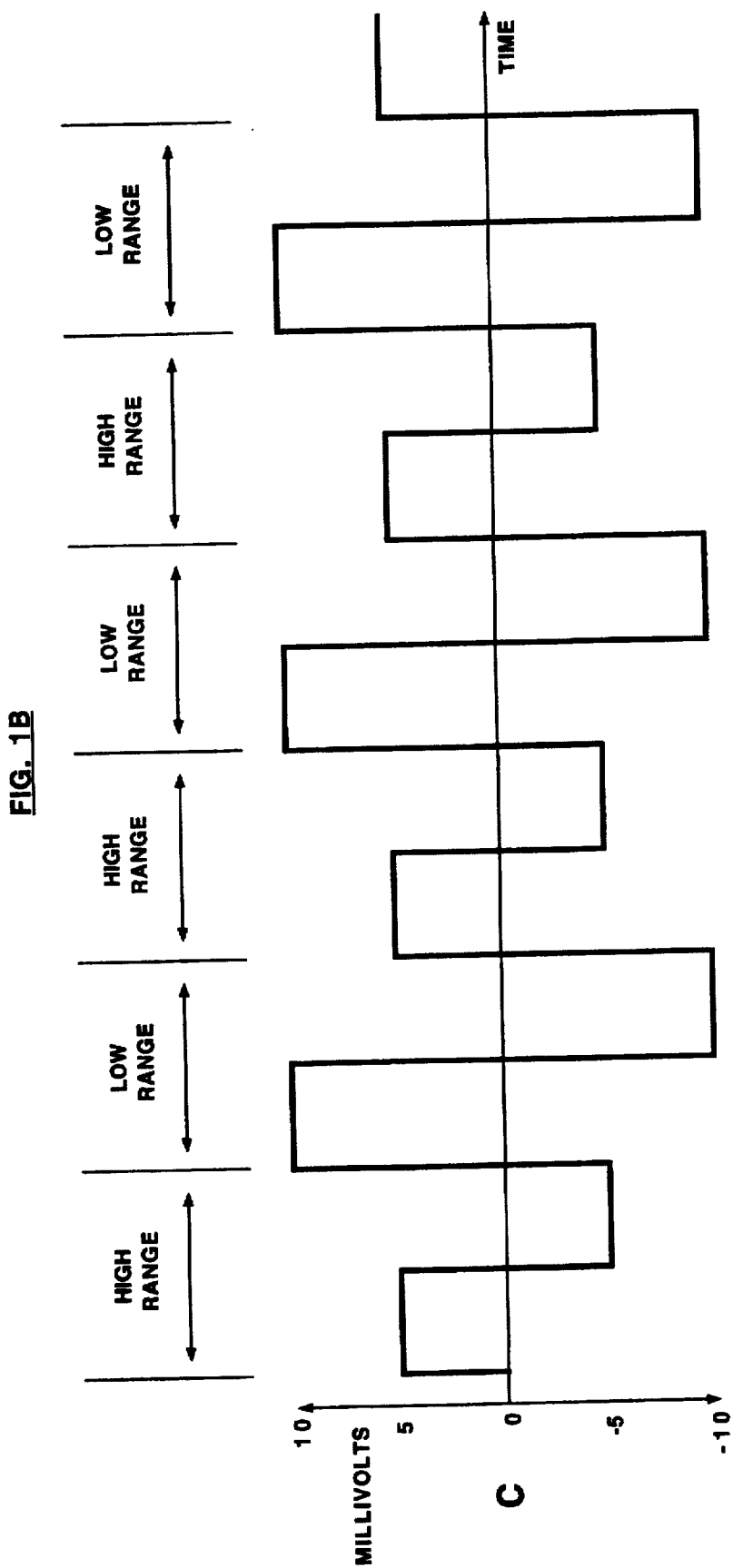
FIG. 1B is a presentation of the pre-amp output for a given load in the embodiment of FIG. 1. The given load exceeding the tolerance of the low range transducer, but not that of the high range transducer.

As can be seen in FIG. 1B, for a given load, the output of low range transducer 25 will be greater than that of transducer 27 (of course once the low range transducer reaches its stops, the output will remain constant with any further increases in the load). Thus, system microprocessor 33 preferably will down load appropriate gain and offset values to ADC 31 so that the digital value for each of the transducers 25 and 27 will each cover substantially the full range of ADC 31. The speed at which ADC 31 works to produce the digital data signal must be factored by system microprocessor 33 when controlling the steering of the excitation at the multiplexer 23 on a time division basis E. Preferably, the system is run synchronously so as to be able to effectively time ADC 31 to multiplexer 23. If system microprocessor 33 does not factor the capability of ADC 31, then the signal C from pre-amp 29 will not be consistent.

The sequence of digital signals from ADC 31 is then input over serial link D at approximately 10 MHz to system microprocessor 33 which concurrently processes signals from alternate periods of composite output signal C to simultaneously track outputs from each of transducers 25 and 27 and selects the appropriate output for a particular level. System microprocessor 33 has built into it preset limits that let it select the appropriate transducer based on the received signal. By simultaneously tracking both outputs, scale system 10 more quickly reestablishes a zero reference for both transducers 25 and 27 when a load is removed from scale platform 19.

Algorithms for tracking load cell or other transducer outputs are well known in the scale art and need not be discussed further for an understanding of the subject invention.

In the embodiment of FIG. 1, where the excitation signal is A.C., the digital signals generated during the negative going parts of the excitation signal will be negative and are inverted during processing by system microprocessor 33. Thus, any noise will be substantially averaged out over each cycle of composite output signal C.

Figure 2:
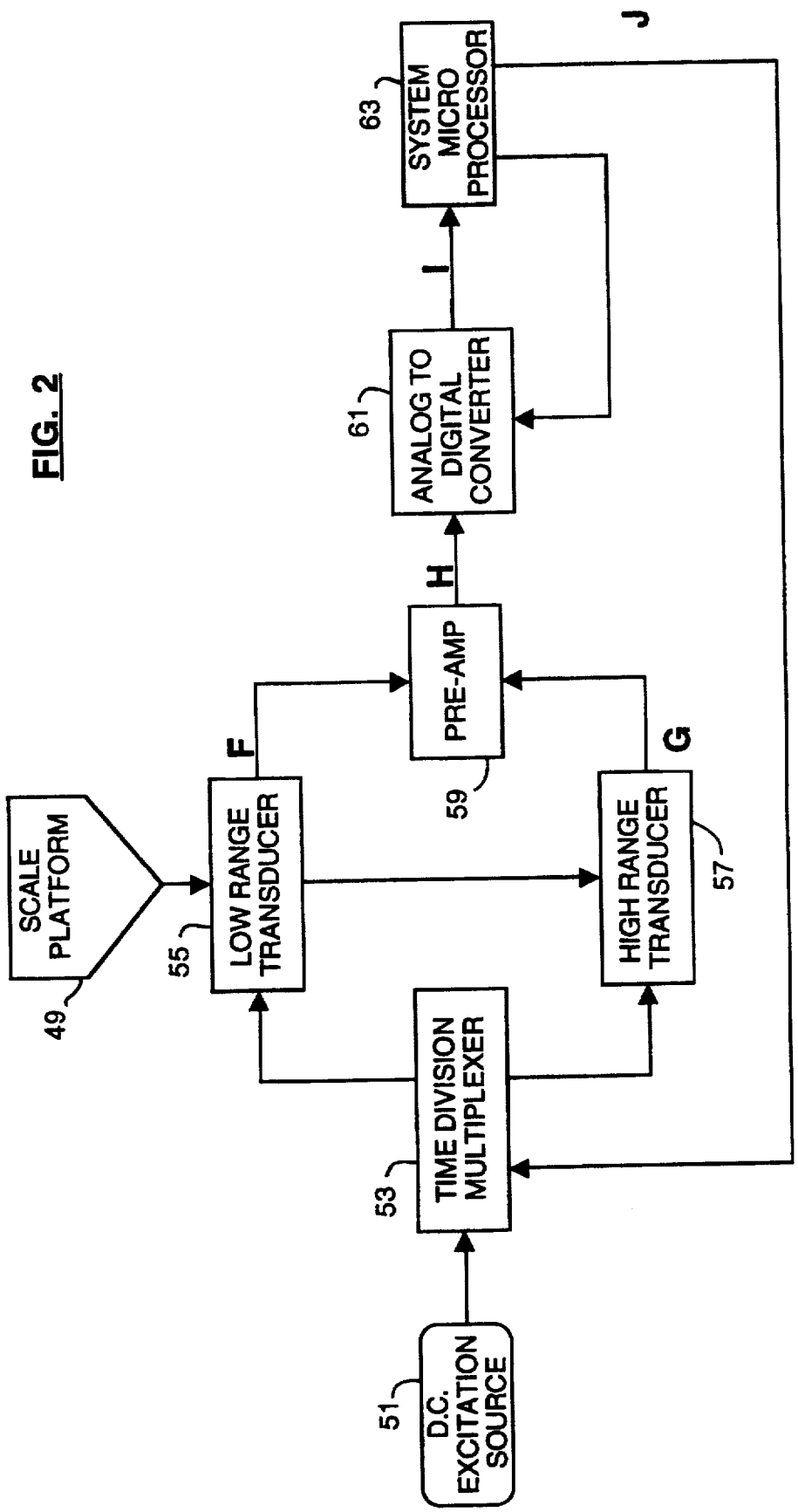
FIG. 2 is a block diagram of an alternative embodiment of the invention showing a D.C. excitation signal.
Figure 2A:
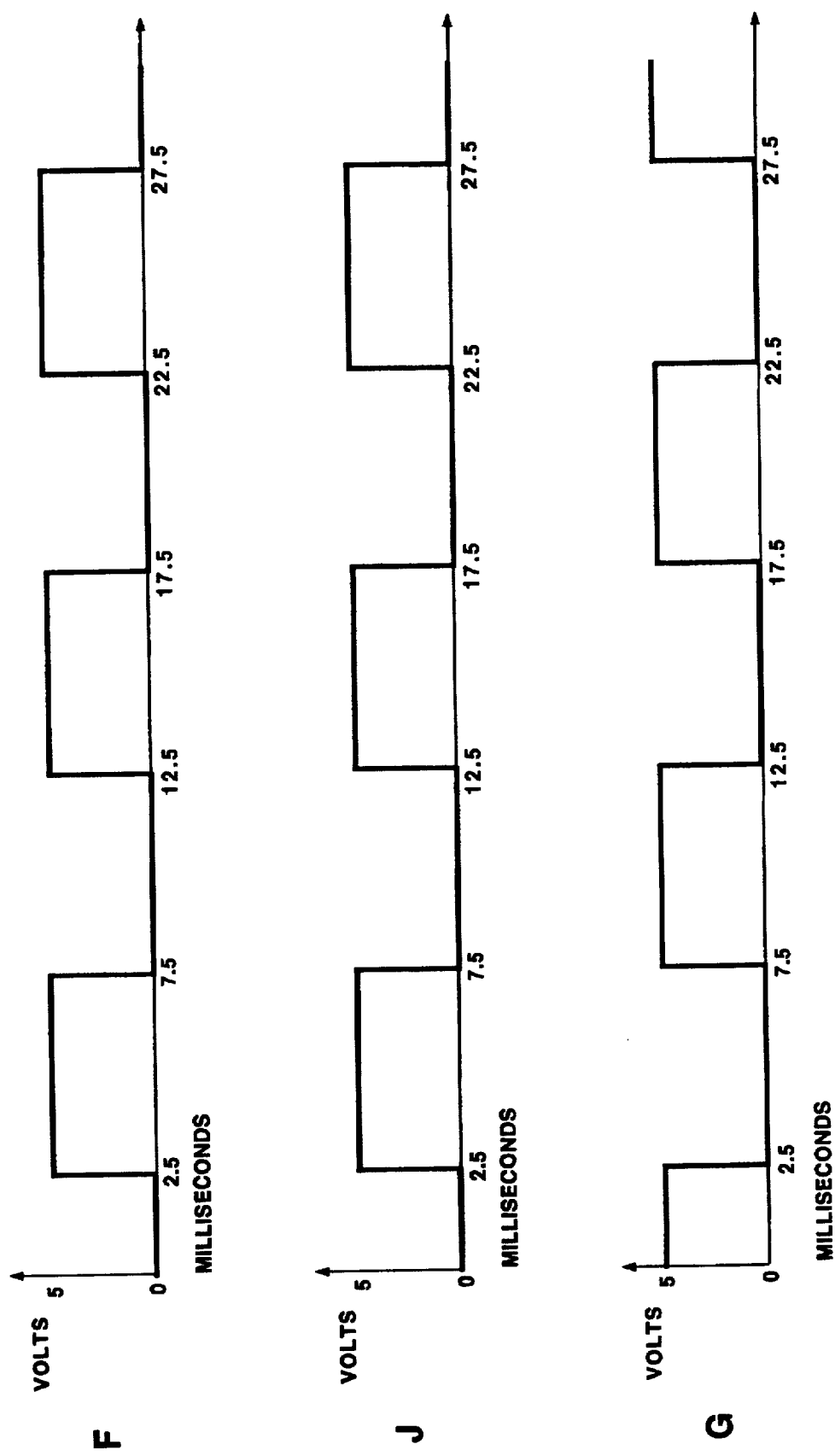
FIG. 2A is a representation of the waveforms being presented by the low range capacity and the high range capacity transducers, and of the steering for the excitation in the embodiment of FIG. 2.
Figure 2B:
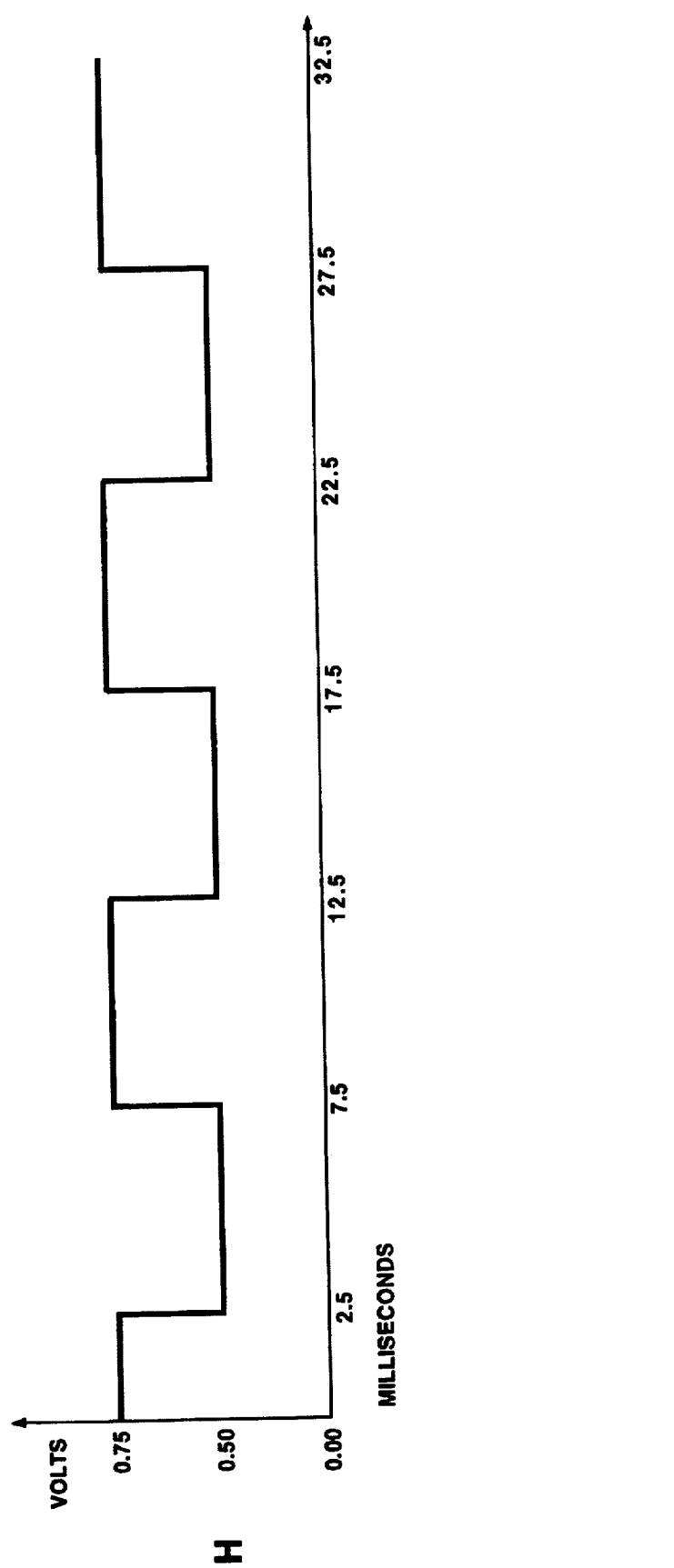
FIG. 2B is a representation of the pre-amp output for a given load in the embodiment of FIG. 2.

In FIG. 2 herein, is displayed an alternative embodiment of the invention in which D.C. voltage in the range of 10 volts from excitation source 51 is applied to the use of multiplexer 53 prior to introduction of the signal to low range transducer 55 and high range transducer 57.

Multiplexer 53 applies a D.C. signal of 10 volts to the appropriate transducer. The steering for the excitation is controlled by system microprocessor 63 on a time division basis J in FIG. 2.

Transducers 55 and 57 are connected in series mechanically such that low range transducer 55 is mechanically stopped before it is overloaded. System microprocessor 63 will shift the signal from low range transducer 55 to high range transducer 57. System microprocessor 63 has built into it preset limits that let it select the appropriate transducer. Output waves F and G of transducers 55 and 57, indicative of the weight placed upon scale platform 49, are connected in parallel and applied to pre-amp 59 where the D.C. error signal is amplified to produce waveform H.

Signal H from pre-amp 59 is then applied to analog-to-digital converter (ADC) 61 for conversion to a digital data signal with a range of $5 \times 10^{-6}$ to 2.5 volts. ADC 61 converts the pre-amp signal H along with the appropriate gain and offset constants loaded in by system microprocessor 63. There will be two sets of constants, one for low range transducer 55 and one for high range transducer 57.

The output of ADC 61 is then sent to system microprocessor 63 over serial link I at approximately 10 MHz. System microprocessor 63 indicates a receive signal to ADC 61 and then applies the appropriate weighing algorithms to the data and then conveys that information to the parent system for: display by a printer, monitor, or other means; further calculations; or as data to be stored.

Figure 3B:
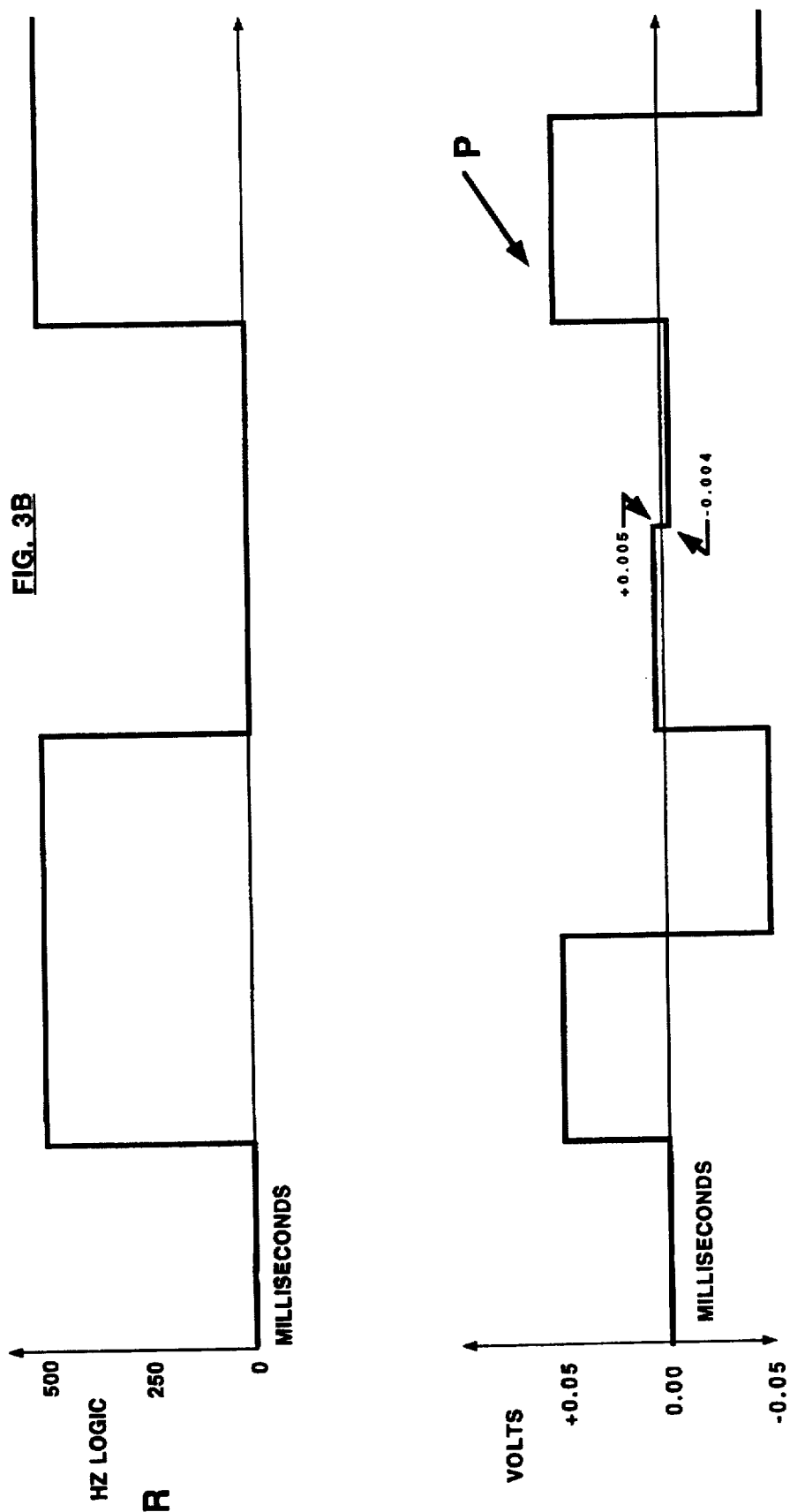
FIG. 3B is a representation of the microprocessor to multiplexer logic and of the multiplexer to ADC signal in the embodiment of FIG. 3.

In FIG. 3 herein, is displayed a flow chart of an alternative embodiment of the invention which demonstrates A.C. voltage K from excitation source 81 being directly applied to low range transducer 85 and high range transducer 87. Transducers 85 and 87 are connected in series mechanically such that low range transducer 85 is mechanically stopped before it is overloaded. Signal L, indicative of the weight placed upon scale platform 79, is introduced by low range transducer 85 to pre-amp 89 for amplification of that transducer's signal. A signal M indicative of the weight placed upon scale platform 79 is introduced by high range transducer 87 to pre-amp 91 for amplification of that transducer's signal.

Signals N and O, coming from pre-amps 89 and 91 respectively, are next introduced to time division analog multiplexer 93 which under control R of system microprocessor 97 selects either the high or the low range signal to be applied P to analog-to-digital converter (ADC) 95. The range selected is dependent upon predetermined criteria set up in system microprocessor 97. The output of ADC 95 is then sent to system microprocessor 97 over serial link Q.

Figure 4:
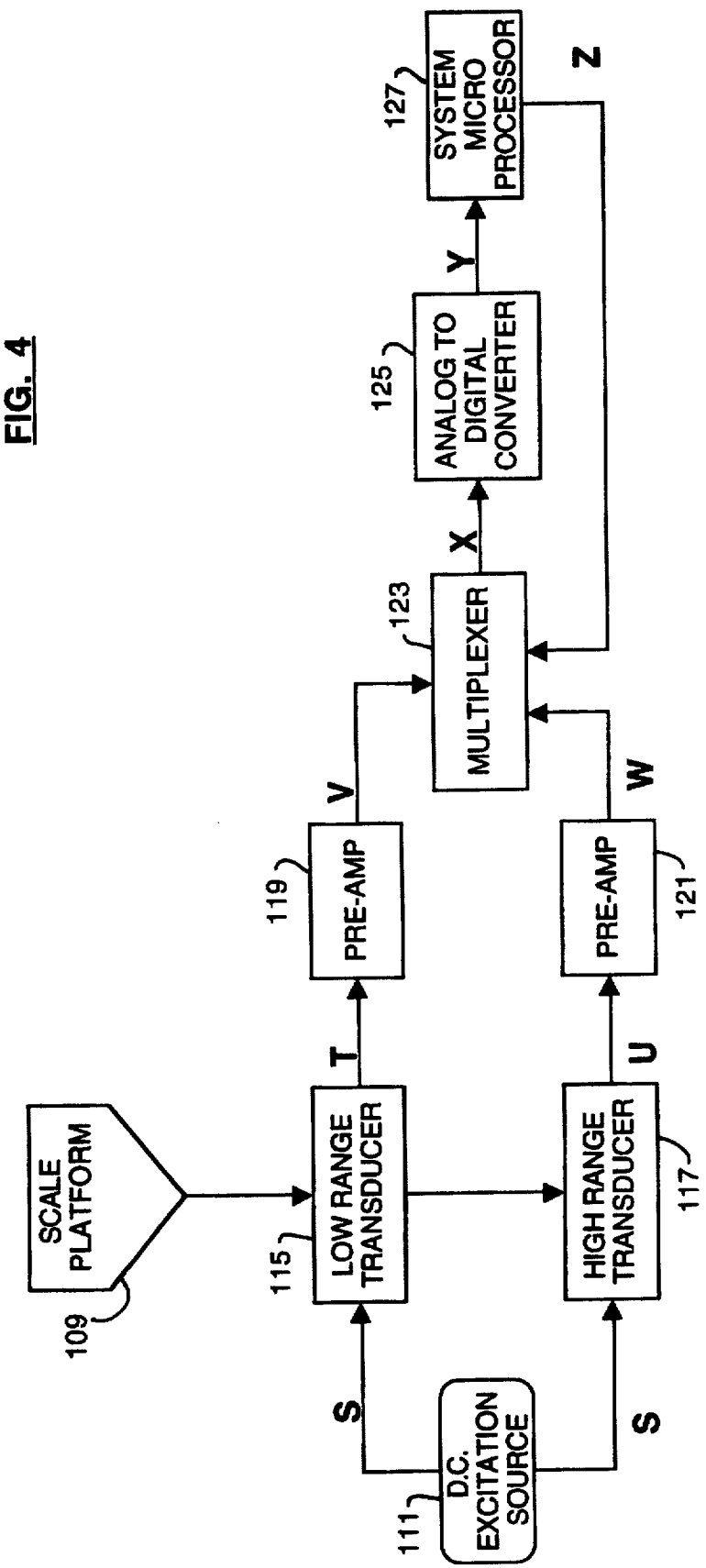
FIG. 4 is a block diagram of an alternative embodiment of the invention wherein a D.C. excitation signal is continuously applied.
Figure 4B:
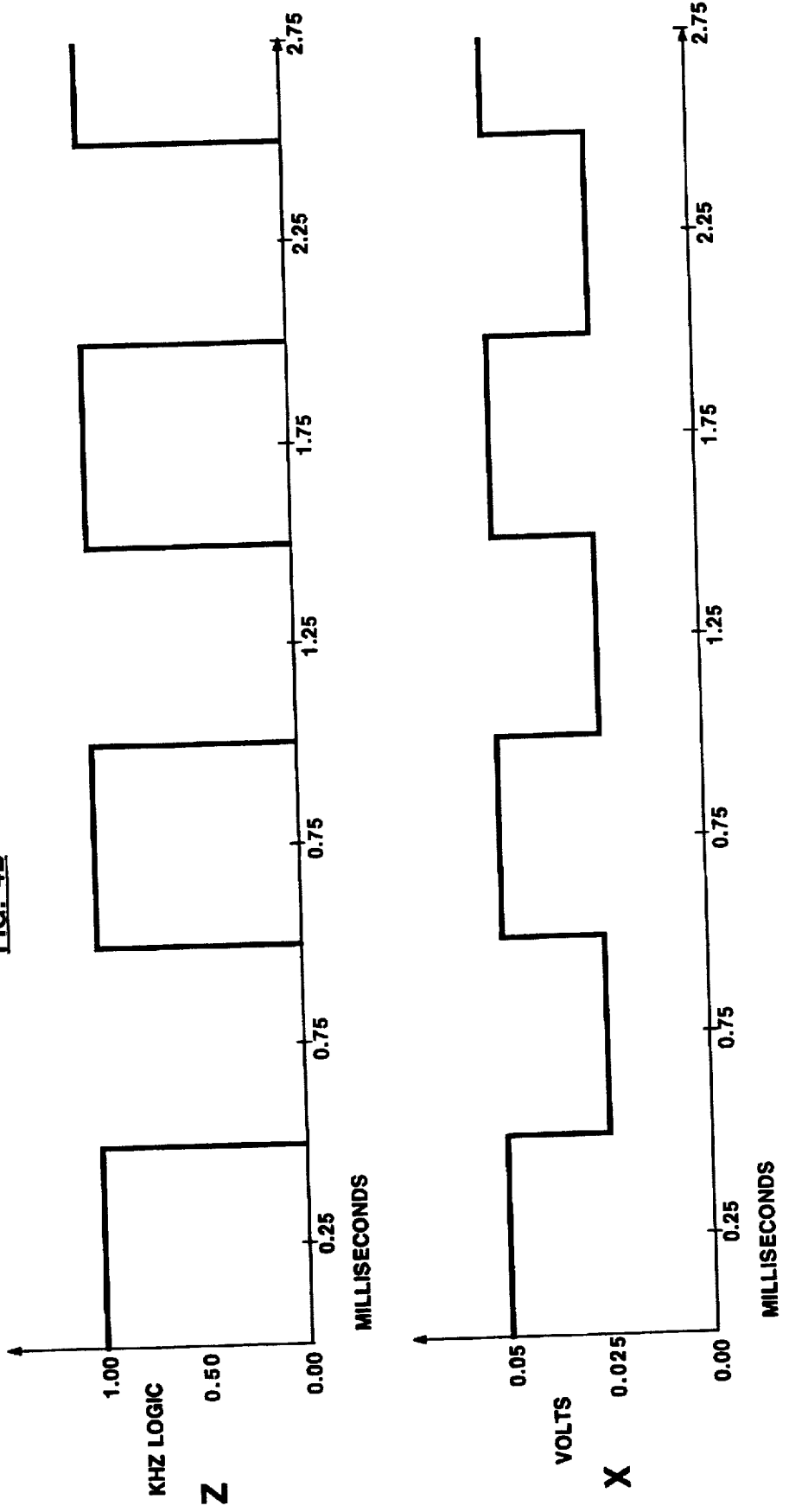
FIG. 4B is a representation of the microprocessor to multiplexer logic and of the multiplexer to ADC signal in the embodiment of FIG. 4.

In FIG. 4 herein, is displayed a flow chart of an alternative embodiment of the invention which demonstrates D.C. voltage S from excitation source 111 being directly applied to low range transducer 115 and high range transducer 117. Transducers 115 and 117 are connected in series mechanically such that low range transducer 115 is mechanically stopped before it is overloaded.

Signal T indicative of the weight placed upon scale platform 109 is introduced by low range transducer 115 to pre-amp 119 for amplification of that transducers signal. Signal U, indicative of the weight placed upon scale platform 109, is introduced by high range transducer 117 to pre-amp 121 for amplification of that transducer's signal.

Signals V and W, coming from pre-amps 119 and 121 respectively, are next introduced to time division analog multiplexer 123 which under control Z of system microprocessor 127 selects either the high or the low range signal to be applied X to analog-to-digital converter (ADC) 125. The range selected is dependent upon predetermined criteria set up in system microprocessor 127. The output of ADC 125 is then sent to system microprocessor 127 over serial link Y.

As can be appreciated by those skilled in the art, a number of variations of the subject invention are possible. These variations include, but are not limited to: the type of excitation source 21 employed; the nature of the multiplexer 23 as to whether or not it is a time division multiplexer or a demand division commutator; the capacity and tolerance of either low range transducer 25 or high range transducer 27; or, of the type of microprocessor used. Accordingly, limitations on the scope of the subject invention are found only in the claims set forth below.

What is claimed is:

1. A scale, having a range, comprising:
   (a) a plurality of transducers for providing a corresponding plurality of output signals representative of a load applied to said scale, each of said transducers having a corresponding load range, said load ranges comprising said range of said scale, said transducers being mechanically connected in series so that said load is applied equally to each of said transducers;
   (b) means for time division multiplexing said outputs to allow for quicker reaction of said scale when shifting from said load to a second load and wherein said time division multiplexing means further comprises excitation means for supplying an excitation signal wherein said excitation signal has a peak value greater than the maximum D.C. signal which can be continuously applied to said transducers;
   (c) a pre-amplifier for amplifying said outputs to produce a wave form which is a composite of said output;
   (d) an analog-to-digital converter for converting said composite output to a sequence of digital signals; and
   (e) data processing means responsive to said sequence for concurrently computing a plurality of weight values, each of said weight values corresponding to one of said outputs and its associated transducer and load range, and for selecting one of said weight values for output if said load is within a corresponding load range.

2. A scale, as described in claim 1, wherein said multiplexing means comprises:

(a) a multiplexer for receiving said excitation signal from said excitation means and cyclically switching said excitation signal to each of said transducers in a predetermined sequence; and (b) means for summing said output signals to provide said composite output.

3. A scale, as described in claim 2, wherein said excitation signal is an A.C. signal.

4. A scale, as described in claim 3, wherein said excitation signal is cyclically switched to each of said transducers for a period equal to one cycle of said excitation signal.

5. A scale, as described in claim 3, wherein said analog-to-digital converter generates at least a first one of said digital signals during each positive going portion of each cycle of said excitation signal and at least a second one of said digital values during each negative going portion of said cycle.

6. A scale, as described in claim 5, wherein said data processing means inverts said second ones of said digital signals before generating said weight values.

7. A scale, as described in claim 2, wherein said excitation signal is a D.C. signal.

8. A scale, as described in claim 7, wherein said D.C. signal is cyclically switched to each of said transducers for a predetermined period.

9. A scale as described in claim 8 wherein said analog-to-digital converter generates at least one of said digital samples during each of said periods.

10. A scale, as described in claim 1, wherein said multiplexing means comprises:

(a) means for continuously providing an excitation signal to each of said plurality of transducers; and (b) a time division multiplexer for receiving said output signals and providing said composite output.

11. A scale, as described in claim 10, wherein said excitation signal is an A.C. signal.

12. A scale, as described in claim 11, wherein said time division multiplexer samples each of said output signals for a period equal to one cycle of said excitation signal.

13. A scale, as described in claim 12, wherein said data processing means inverts said second ones of said digital signals before generating said weight values.

14. A scale, as described in claim 11, wherein said analog-to-digital converter generates at least a first one of said digital values during each positive going portion of each cycle of said excitation signal and at least a second one of said digital values during each negative going portion of said cycle.

15. A scale, as described in claim 1, wherein said time division multiplexer means samples each of said output signals for a pre-determined period.

16. A scale, as described in claim 1, wherein said analog-to-digital converter generates at least one of said digital samples during each of said periods.

17. A scale, as described in claim 1, wherein said transducers are load cells.

18. A scale, as described in claim 1, wherein said plurality of transducers consists of a high range load cell and a low range load cell.

19. A scale, as described in claim 1, wherein said data processing means provides predetermined gain and offset values to said analog-to-digital converter, said values corresponding to particular ones of said transducers, and said values being supplied for conversion of said outputs of said corresponding transducers.

* * * * *